United States Patent
Jaffee (10) Patent No.: US 9,412,097 B2
(45) Date of Patent: Aug. 9, 2016

(54) SYSTEM AND METHOD FOR FACILITATING STRUCTURED MEETINGS

(71) Applicant: Thomas A. Jaffee, Boca Raton, FL (US)

(72) Inventor: Thomas A. Jaffee, Boca Raton, FL (US)

(*) Notice: Subject to any disclaimer, the term of this patent is extended or adjusted under 35 U.S.C. 154(b) by 153 days.

(21) Appl. No.: 14/086,164

(22) Filed: Nov. 21, 2013

(65) Prior Publication Data

US 2014/0222483 A1 Aug. 7, 2014

Related U.S. Application Data

(60) Provisional application No. 61/760,792, filed on Feb. 5, 2013.

(51) Int. Cl.
*G06Q 10/10* (2012.01)

(52) U.S. Cl.
CPC .................................. *G06Q 10/1095* (2013.01)

(58) Field of Classification Search
None
See application file for complete search history.

(56) References Cited

U.S. PATENT DOCUMENTS

| | | | |
|---|---|---|---|
| 6,363,352 B1 * | 3/2002 | Dailey et al. | 705/7.19 |
| 6,433,813 B1 * | 8/2002 | Forkner et al. | 348/14.07 |
| 6,963,900 B2 * | 11/2005 | Boyd | 709/204 |
| 7,679,518 B1 * | 3/2010 | Pabla et al. | 340/573.1 |
| 2003/0105820 A1 * | 6/2003 | Haims et al. | 709/205 |
| 2006/0062367 A1 * | 3/2006 | Christenson et al. | 379/202.01 |
| 2007/0285502 A1 * | 12/2007 | Yee | 348/14.08 |
| 2014/0074536 A1 * | 3/2014 | Meushar et al. | 705/7.19 |

* cited by examiner

*Primary Examiner* — Sunit Pandya (57) ABSTRACT

A system for facilitating organized and structured meetings of one or more users through a server. The system includes a processor and a memory unit. The memory unit stores data related to the assignment of meetings and the processor is operable to process a registration module for users, an event setup module for setting up an event, a meeting request module for sending meeting requests, and a meeting assignment module. The event setup module allows the user to set up an event and further allows creation of one or more sessions and list of categories for each session, furthermore to create rules based on the categories and then assign locations and schedule for each session. The meeting request module to allow submission of request for meetings during the session. The meeting assignment module to assign meetings between two registered users on the basis of the rules submitted under meeting request module.

12 Claims, 14 Drawing Sheets

SUBMIT MEETING REQUESTS ← 112c

1002 — Software Developers Association of Santa Clara, CA - 2013 Annual Meeting

Speed Networking 1

September 19, 2013    12:00PM - 1:00PM    Ballroom A 1004 — Who do you want to meet at THIS session?

1006 — ○ Assign meetings for me
     ○ I will Request Meetings Instructions ● Select YES to increase your chances of meeting someone.

● Select NO to decrease your chances of meeting someone.

● Select NEUTRAL if you are willing to meet with those individuals.

*Note: Due to inherent limitations, not all requested meetings can be arranged.*

SYSTEM AND METHOD FOR FACILITATING STRUCTURED MEETINGS

CROSS-REFERENCE TO RELATED APPLICATION

This application claims priority to a U.S. Provisional Application No. 61/760,792 filed on Feb. 5, 2013, the entire contents of which are incorporated herein by references in its entirety.

BACKGROUND OF THE INVENTION

1. Field of the Invention

The present invention generally relates to a system and a method for online or in-person meetings, and more particularly relates to a system and method for providing pre-assigned meetings based on categories and requests submitted by the event organizer or attendees.

2. Description of Related Art

At most events, it is difficult to meet the right people. The business networking sessions at most events have no structure or technology to assist in the process. Instead, attendees have to identify other interested parties to talk with, and then create an opportunity to talk with that person. Further, if the desired party is already talking with someone else, those who wish to meet him/her need to find a way to capture his/her attention, then introduce themselves to him/her, conduct the conversation, and then end the conversation with enough time to efficiently meet other people at the function. This "typical" process of business networking is inefficient, even for outgoing personalities.

A "speed networking system" is an online platform that enables attendees of an event to efficiently meet other people at the event. Various software applications are known in the art for providing an online platform for facilitating meetings at events. These events can be for various purposes such as business, professional, social, and singles/dating.

Mobile applications currently available for the event industry include features such as personal profiles of the event attendees, automated meeting recommendations, scheduling systems that enable event attendees to arrange their own one-on-one meetings, tradeshow floor maps, conference agenda schedules, conference session recommendations, blogs, social networking and more.

Also, some companies are offering speed networking sessions, but these typically use a "musical chairs" method where participants move sequentially to the next person in line, rather than being assigned to a series of meetings that have been pre-determined to be of mutual interest to both participants. To increase the likelihood of providing mutually desired meetings at an event, there is a need for a system and method that enables categories and meeting requests to be input beforehand that instruct the system to assign, or not assign, meetings to participants, and further, that allows certain users to manually change meeting assignments as needed.

SUMMARY OF THE INVENTION

In accordance with the teachings of the present invention, a system and a method for facilitating pre-assigned meetings between two or more users over a communication network, is provided.

Objective, required components of the invention include a processor and memory unit. The memory unit stores data related to the assignment of meetings and the processor is operable to process a registration module and an event organizer module, a meeting request module and a meeting assignment module.

Another objective of the present invention is for the system to receive inputs from users either prior to the event or during the event, and to quickly output the meeting assignments to users at the event. Another objective of the present invention is for the system and the method to provide the event setup module with an event organizer details module for allowing submission of the details of the event organizer.

Another objective of the present invention is for the system and the method to provide the event setup module with an event details module for allowing submission of the event details.

Another objective of the present invention is for the system and the method to provide the event setup module with attendees allowed module for allowing selection of the types of attendees who may attend the event.

Another objective of the present invention is for the system and the method to provide the event setup module with a session setup module for allowing selection of the types of session for the event.

Another objective of the present invention is for the system and the method to provide the event setup module with a categories module for allowing submission of details for the creation of the categories for the event.

Another objective of the present invention is for the system and the method to provide the event setup module with a payment module for allowing at least one of the attendees to pay either for providing or attending the event.

Another objective of the present invention is for the system and the method to provide the event setup module with an activity group module for allowing submission of the event details. Another objective of the present invention is for the system and the method to provide a meeting request module for providing one or more options to the registered users for requesting meetings with other attendees of interest.

Another objective of the present invention is for the system and the method to provide a follow up module for following up with the interested attendees for future meetings and provides access to the messaging and calendar modules to facilitate the communication and scheduling of a follow up meeting.

These and other objects, features and advantages of the invention will become more fully apparent in the following detailed description, taken in conjunction with the accompanying drawings.

DETAILED DESCRIPTION OF DRAWINGS

While this technology is illustrated and described in a preferred embodiment, a system and a method for generating an optimized set of meeting assignments for meeting participants may be produced and described in many different configurations, forms and various methods, without deviating from the scope of present invention. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

Figure 1:
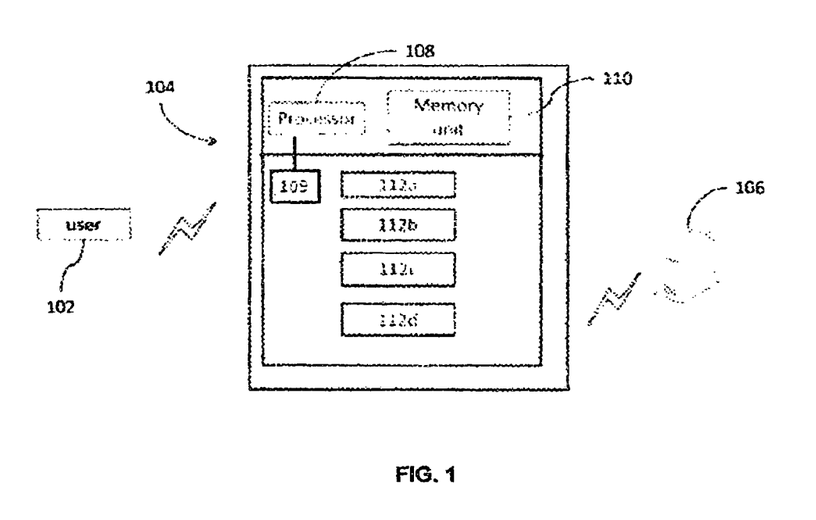
FIG. 1 is a schematic overview of the components of a business networking environment, in accordance with an embodiment of the present invention.

FIG. 1 is a schematic overview of the components of a business networking environment 100. The business networking environment 100 includes a user 102, a system 104 and a server 106. The system 104 is operated by the user 102 and communicates with the server 106. Example of the user 102 includes but not limited to corporate staff, event organizer, event attendees, session participants, etc. The system 104 includes a processor 108 connected to the server a graphical user interface 109 for displaying processed data; and a memory unit 110.

The memory unit 110 stores data related to assignment of meetings. The processor 108 is operable to process a registration module 112a, an event setup module 112b, meeting request module 112c and a meeting assignment module 112d. The registration module 112a displayed on the graphical user interface receives input from one or more users 102 using their input device to register them either as an attendee 102 or an organizer 102 through the server. Examples of the input device include but not limited to a mouse, keyboard, stylus etc. The registration module 112a is explained in detail in conjunction with FIG. 1A of the present invention. In a preferred embodiment of the present invention, the system 100 facilitates in arranging pre-assigned meetings between at least two users 102.

In an embodiment of the present invention, an event may refer to the overall gathering (examples of which may include a 3 day conference or meeting, or 1 hour speed networking session, or many other types and durations of events). An event may contain one or more sessions. A session may refer to one instance of an implementation of the structured business networking system at an event. A meeting may be a one-on-one or group meeting assignment provided by the meeting assignment module 112d.

In an embodiment of the present invention, an event may refer to the overall gathering (e.g., a 3 day conference or tradeshow, or 1 hour speed networking session, etc.). An event may contain one or more sessions. A session may refer to one instance of an implementation of the structured business networking system at an event. A meeting may be a one-on-one or group meeting so assignment provided by the meeting assignments optimization algorithm. A session at the event can be a speed networking activity, a meal table assignment or a group activity.

Examples of system 104 include but not limited to a tablet pc, a laptop, a mobile phone using an Apple, Android, Windows, UNIX or other operating system equipped with a mobile app or a standard web-browser application and capable of connecting to the Internet. It should be noted that the term Internet is intended to encompass similar systems as well (i.e., World Wide Web or www) comprising the capability to communicate and access information through a network, telephone connections, ISDN connections, DSL connections, cable modem, etc.

Examples of memory unit 110 include but not limited to memory card, read-only memory (ROM), flash memory, dynamic random access memory (DRAM) (such as synchronous DRAM (SDRAM) or Rambus DRAM (RDRAM), static random access memory (SRAM), etc.

The event setup module 112b displayed on the graphical user interface receives input from one of the one or more organizers 102 to set up at least one event to become an event organizer. In a preferred embodiment of the present invention, the event setup module 112b allows the event organizer to set up an event. Further, the event setup module 112b allows the event organizer to create one or more sessions at the event for allowing the users to become attendees of the event and to allow attendees to become participants in the one or more sessions of the event. Further the event setup module 112b includes creation of categories for defining the participant's roles at each session during the event. The event setup module 112b further allows assigning of location and schedule for each session. The event setup module 112b is explained in detail in conjunction with FIG. 2 to FIG. 9 of the present invention.

The meeting request module 112c displays a list of attendees on the graphical user interface for facilitating pre-assigned meetings among the one or more attendees 102. The meeting request module 112c displays at least two options for receiving requests from at least one attendee registered for the event to meet or not meet other attendees displayed on the list, wherein at least one attendee selects at least one of the option using the input device either meet or not meet at least one of other attendees on the basis of categories created by the organizer in the event setup module 112b. The meeting request module 112c is explained in detail in conjunction with FIG. 10 and FIG. 11 of the present invention.

The meeting assignment module 112d displays a list of meetings that are computed based on the options selected by one or more attendees to meet other attendees indicating which other attendees they are interested in meeting at the event at preferred time and location; wherein the meeting assignment module optimizes all the meeting assignments for the event and the optimization is more likely to assign meetings between attendees who requested meeting with each other at the event. In a preferred embodiment of the present invention, the meeting is assigned in the desired category and at a desired location and schedule among the attendees 102. The meeting assignment module 112d is explained in detail in conjunction with FIG. 12 of the present invention.

Figure 1A:
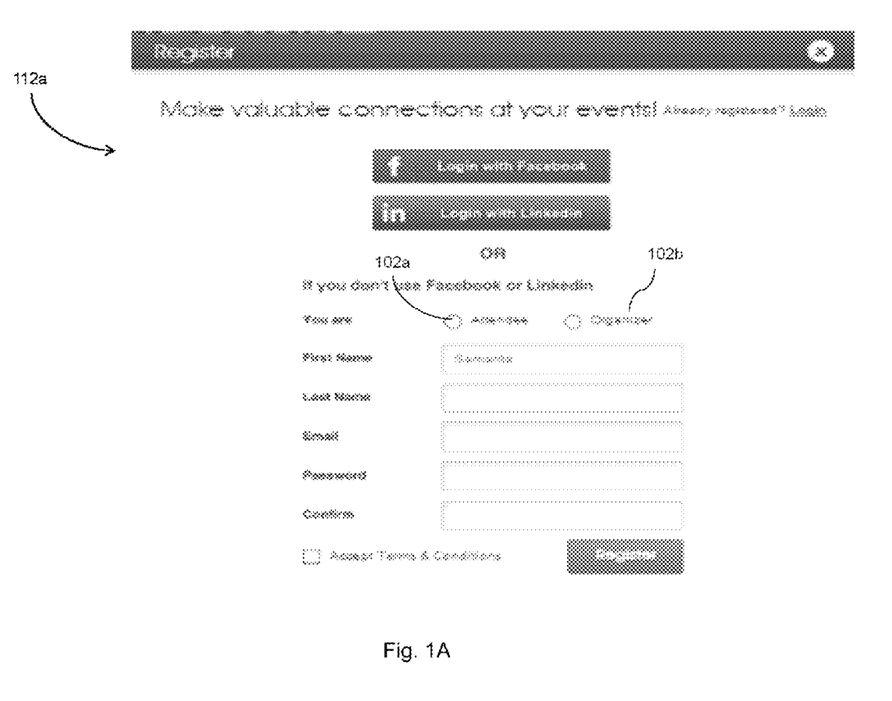
FIG. 1A is a screenshot showing, by way of an example, a Web page for a registration module.

FIG. 1A is a screenshot showing of a registration module 112a for registration of one or more users 102 either as an attendee 102a and/or an event organizer 102b. The attendee 102a is registered to participate in the events created and the event organizer 102b is registered to create the events. The user 102 may register for the event by providing information including First Name, Last Name, Email ID, Password etc. In another preferred embodiment of the present invention, the user 102 may further be asked to accept terms and conditions for participating in the events.

The registration module 112a further allows updating of a registered account of one or more users 102. Types of registration include but not limited to entering a new user's details, or connecting via user's registered accounts from social networking websites including facebook, LinkedIn, etc., or by importing each user's information from a third-party event website and/or registration system such as Meetup, Event-Brite, etc.

Figure 2:
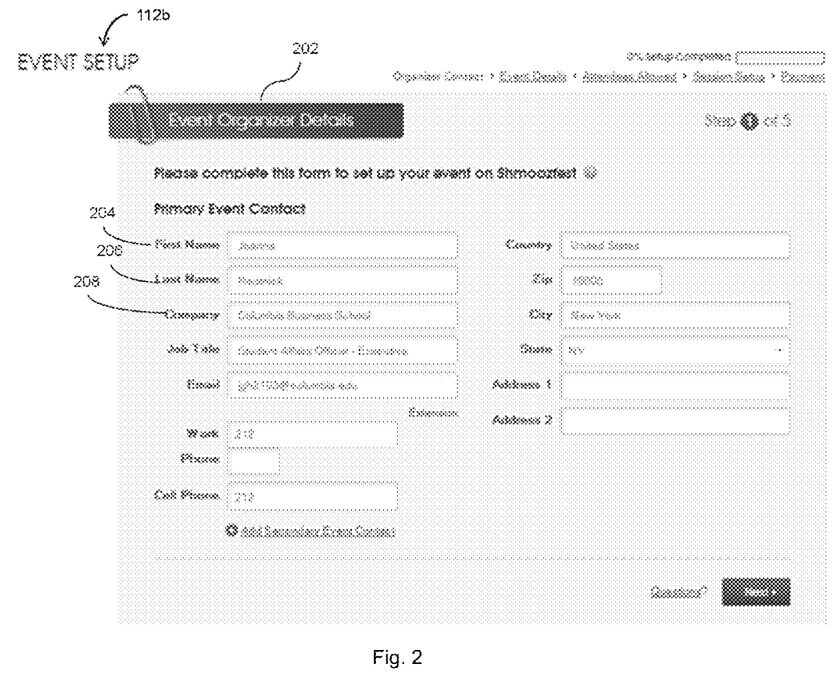
FIG. 2 is screen shot showing, by way of an example, a Web page for setting up an event organizer details module.

FIG. 2 is a screenshot showing the first step to set up an event in the event setup module 112b. The event setup module 112b includes an event organizer details module 202. The event organizer details module 202 allows the event organizer to submit their details for the event. In a preferred embodiment of the present invention the details are submitted via the internet.

Examples of details required to set up event organizer details module 202 include but not limited to First Name 204, Last Name 206, and Company 208. As shown in FIG. 2, the event organizer may further add more information like Job Title, Email ID, Work Phone, Cell Phone, Country, Zip Code, City, State and Address. However it is to be noted that other information may also be submitted via the event organizer details module 202 without deviating from the scope of the present invention.

Figure 3:
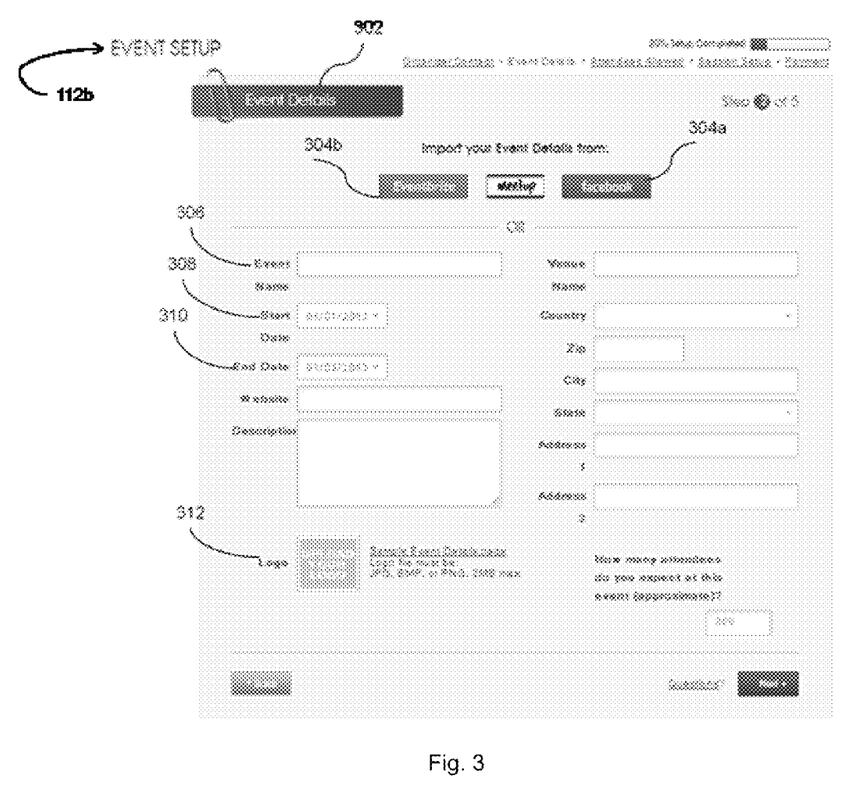
FIG. 3 is screen shot showing, by way of another example, a Web page for an event details module.

FIG. 3 is a screenshot showing a second step of setting up an event in the event setup module 112b. The event setup module 112b further includes an event details module 302. The event details module 302 allows registration of event details required for setting up of the event. In a preferred embodiment, the event details for the event details module 302 may be imported from social networking or event planning websites. Example of social networking or event planning websites include but not limited to facebook 304a, twitter, LinkedIn, Meetup, EventBrite 304b, etc. In another preferred embodiment of the present invention, the event details may be input manually by the event organizer.

The event details module 302 may include but not limited to event name 306, start date of the event 308, end date 310, website, event description, venue name, country, zip, city, state and address. In another preferred embodiment of the present invention, the event details module 302 further allows uploading of a logo 312.

Figure 4:
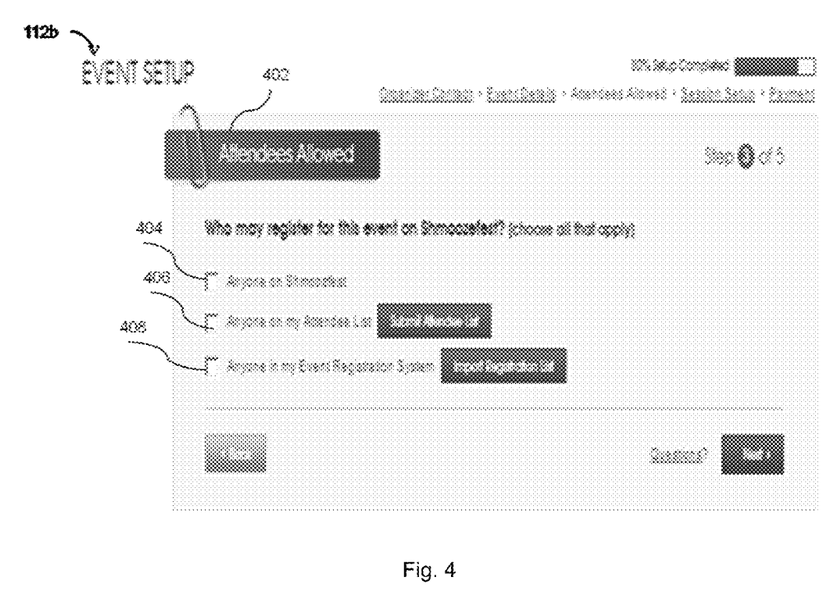
FIG. 4 is a screen shot showing, by way of another example, a Web page for attendees allowed module.

FIG. 4 is a screenshot showing a third step to set up the event in the event setup module 112b. The event setup module 112b further includes attendees allowed module 402 to allow the event organizer to select the specific individuals or types of attendees who may attend the event. In a preferred embodiment of the present invention, the event organizer may select from the three options for selecting the users who may register for the event.

The first option 404 allows any user to become an attendee of the event, second option 406 allows anyone on the event organizer's attendee list to register for the event, and the third option 408 allows anyone who has pre-registered via the event organizer's third party registration system to register for the event. However, it will be readily apparent to those skilled in the art that other options for registering the users as attendees of the event may be envisioned without deviating from the scope of the present invention.

Figure 5:
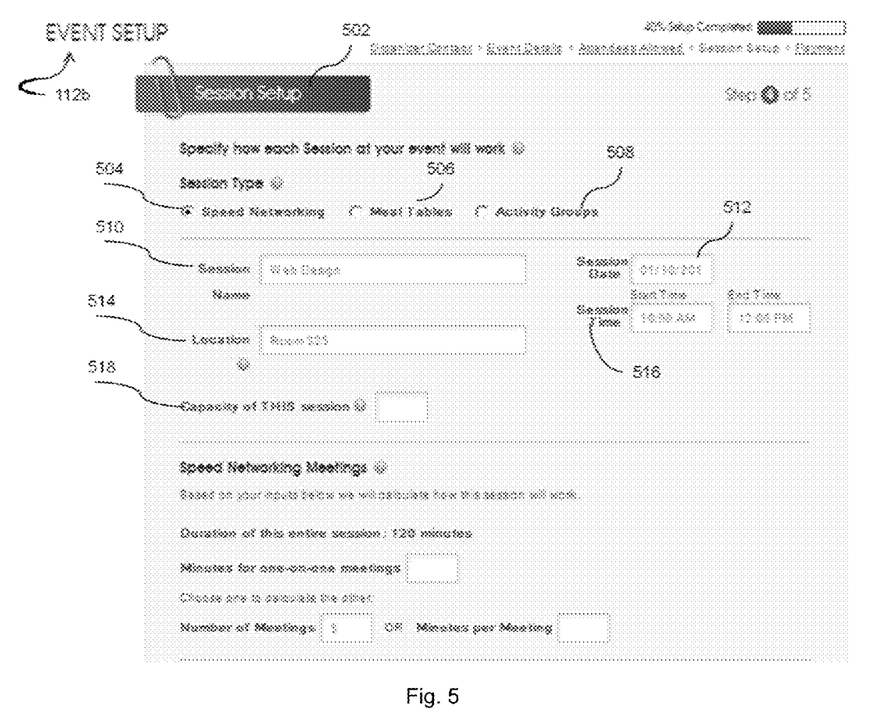
FIG. 5 is a screen shot showing, by way of an example, a Web page for session setup module.

FIG. 5 is a screenshot showing the fourth step to set up the event in the event setup module 112b. The event setup module further includes a session setup module 502 for allowing the event organizer to select the type of session. Types of session include but not limited to speed networking session 504, meal tables sessions 506 and activity groups 508. If the event organizer selects the meal table session 506 then a table number is assigned to the participants along with the list of other people who are sitting at their table during the meal.

In an exemplary embodiment, as shown in FIG. 5, a speed networking session 504 is created. The speed networking session 504 allows the event organizer to submit details like session name 510, session date 512, session location 514, session time 516 and capacity of this session 518. It is to be noted that those skilled in the art may envision other details in the session without deviating from the scope of the present invention. Furthermore, the session setup module 502 allows the event organizer to specify the duration of the entire session, the number of minutes in the session that are dedicated to one-on-one meetings, and the number of meetings during the session. Basically, the speed networking session 504 provides sequential 1:1 meetings and the meal table session 506 are 1:N meetings.

Figure 6:
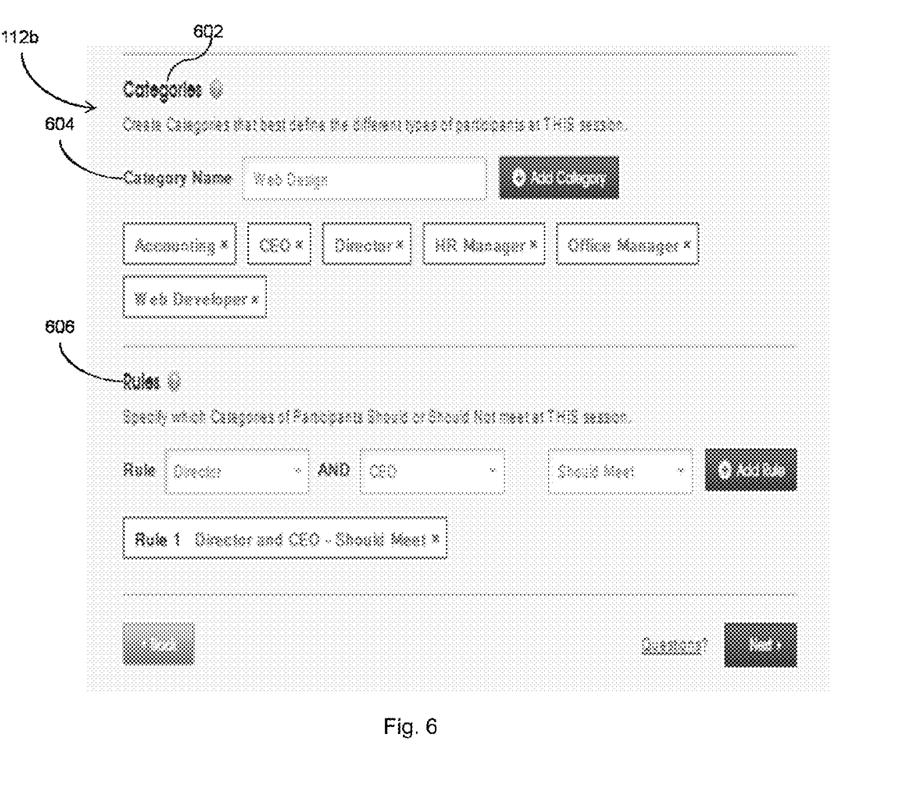
FIG. 6 is screen shot showing, by way of another example, a Web page for creating categories for a session through categories module.

FIG. 6 is a screenshot showing continuation of step four for setting up the event in the event setup module 112b. The event setup module 112b further includes categories module 602. The categories module 602 allows the event organizer to submit details for the creation of the categories for each session. The event details include details such as category name 604. In an exemplary embodiment, for an executive's event, the categories might be CEO, CFO, CMO, etc. For a baseball event, the categories might be pitcher, catcher, outfielder, etc. One purpose for the creation of the categories module 602 is to allow the attendees to identify and request meetings with other attendees of interest at their event based on the category that the other attendees are assigned to.

In another preferred embodiment of the present invention, the categories module 602 further allows the event organizer to set rules based on the categories, and the rules are provided as inputs to the event setup module 112b to be used as inputs to the optimization calculations that determine which attendees will be assigned meetings with one another. In an exemplary embodiment of the present invention as shown in FIG. 6, the event organizer may set a rule 606 that Directors and CEOs should meet. In another preferred embodiment of the present invention, the event organizer may add additional rules for the event. However, it will be readily apparent to those skilled in the art that various other rules 606 may also be envisioned without deviating from the scope of the present invention.

Figure 7:
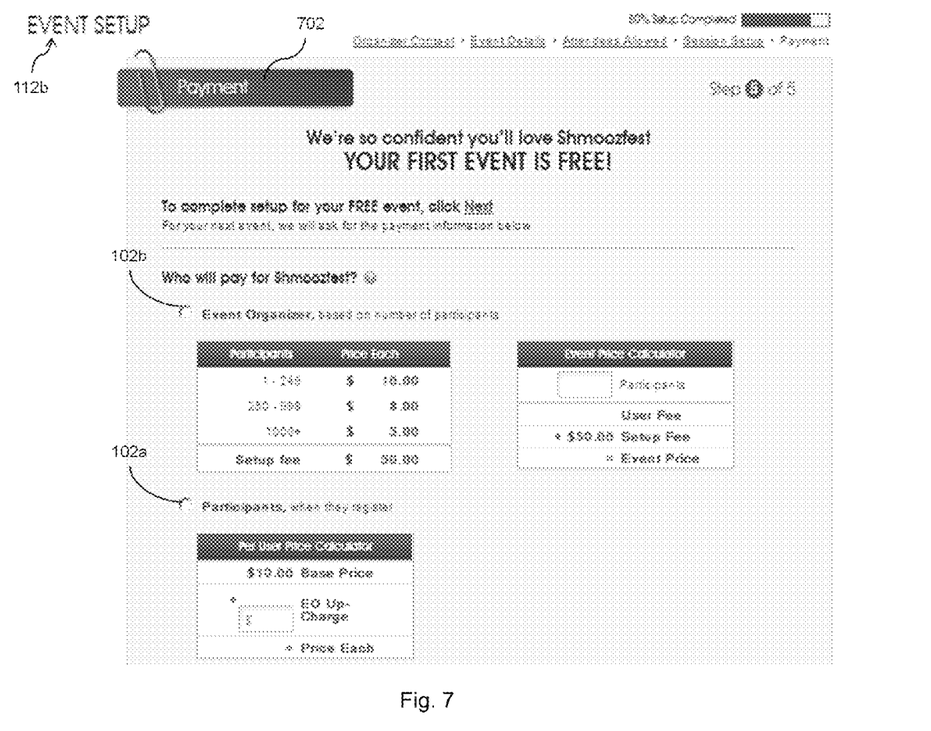
FIG. 7 is screen shot showing, by way of an example, a Web page for payment module.

FIG. 7 is a screenshot showing the fifth step to set up the event in the event setup module 112b. The event setup module 112b further includes a payment module 702 for allowing the event organizer 102b or the attendees 102e to either pay for providing or attending the event, respectively. In a preferred embodiment of the present invention, the fees for providing an event by the event organizer depends on the number of participants. In a preferred embodiment of the present invention, the payment may be made through a credit card, paypal, and/or other electronic means. However, it may be readily apparent to those skilled in the art that various other ways for collecting the money through the payment module 702 may be envisioned without deviating from the scope of the present invention.

Figure 8:
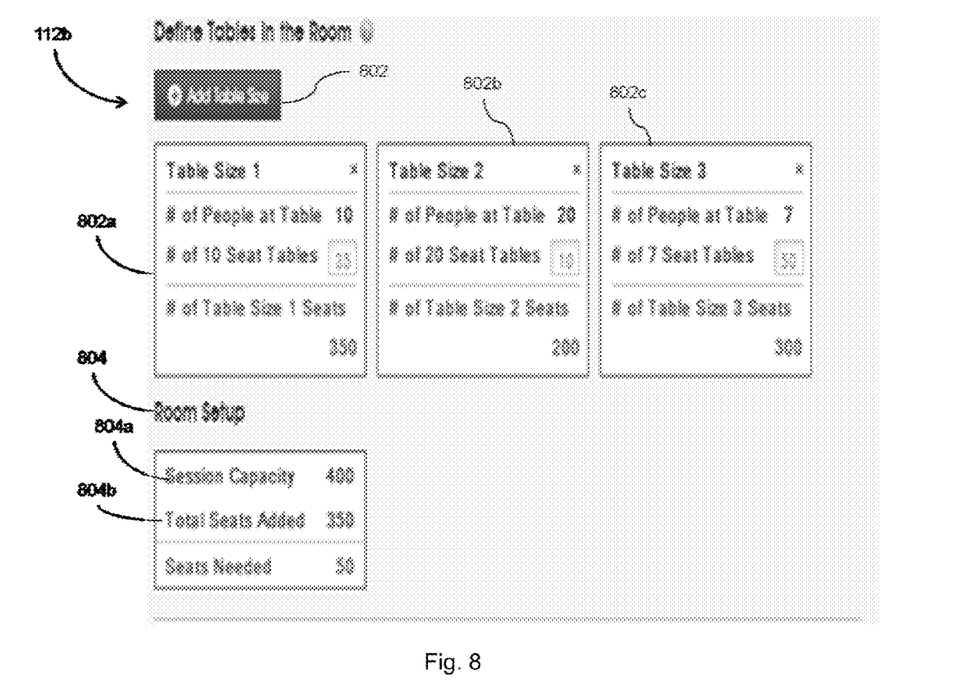
FIG. 8 is screen shot showing, by way of an example, a Web page for specifying the configuration of tables for a table module.
Figure 13:
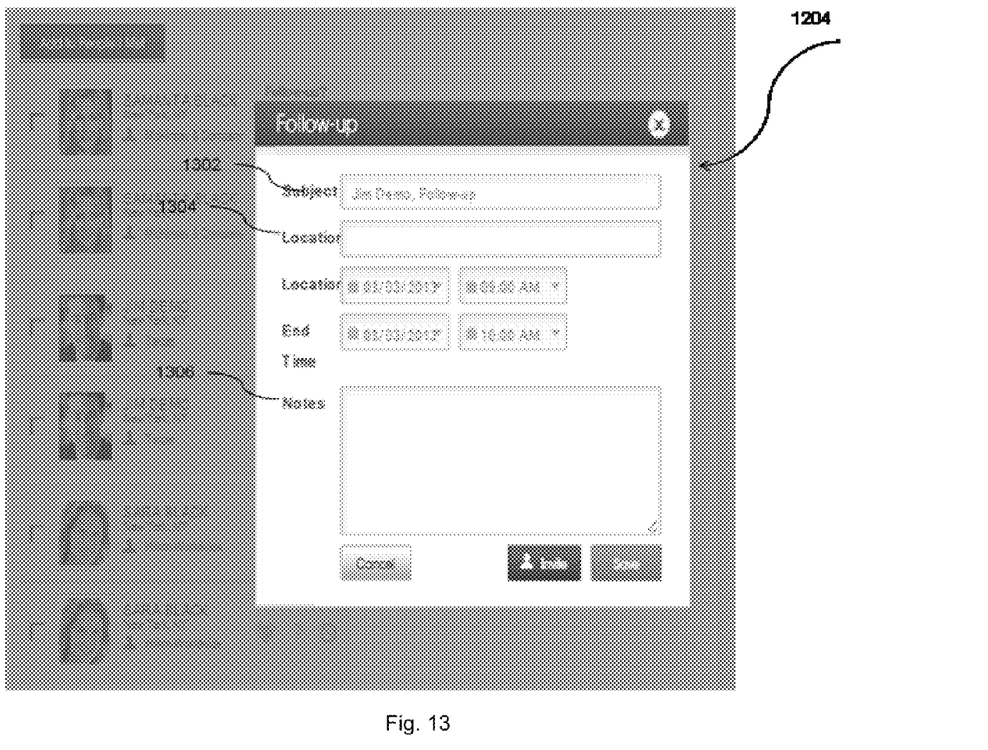
FIG. 13 is a screen shot showing, by way of an example, a Web page of the follow up module.

FIG. 13 is a screenshot showing sixth step to set up the event in the event setup module 112b. The event setup module 112b further includes a table module 802 for creating one or more tables to allow seating for assigned meetings between the participants during the session. In an exemplary embodiment of the present invention, the tables may be configured as shown in FIG. 8.

Examples of Tables include Table Size1 802a, Table Size2 802b and Table Size3 802c. Table Size1 802a includes '10' as the number of participants at the table 802a, and 35 as the number of 10 seat tables. Hence, the total number of seats is 350 at the 35 tables of Table Size1 802a. Similarly, various tables may be added for different sizes, such as shown in Table Size2 802b and Table Size3 802c. Further, the event setup module 112b includes a room setup module 804 for displaying the summary of the session capacity, the total seats added and total seats needed to accommodate the session capacity. In an exemplary embodiment of the present invention, the session capacity 804a is 400 and total seats added 804b is 350, so seats needed is 50.

Figure 9:
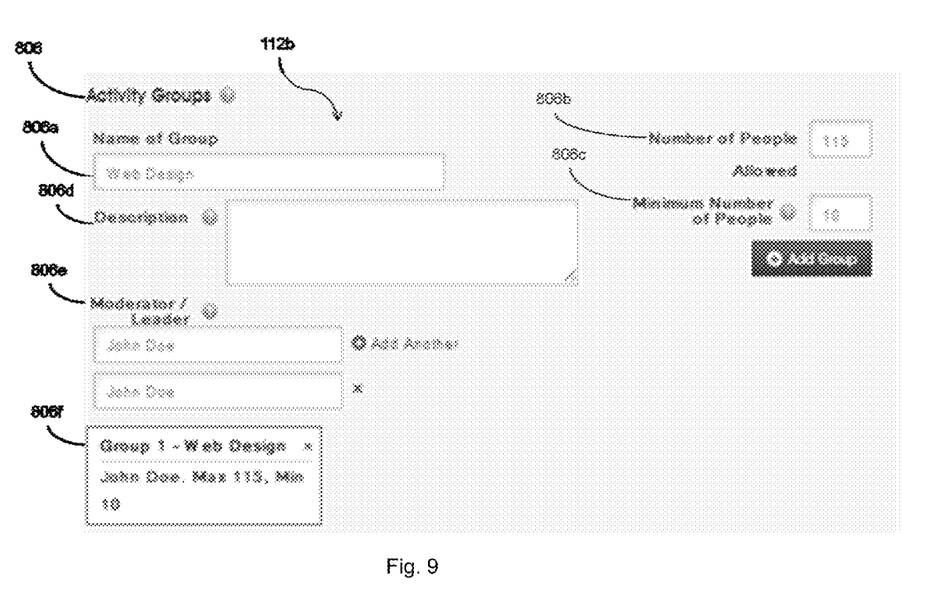
FIG. 9 is screen shot showing, by way of an example, a Web page for creating activity groups in an activity group session.

FIG. 9 is a screenshot showing continuation of step six of setting up an event in the event setup module 112b. The event setup module 112b further includes an activity groups module 806 for allowing submission of details for the setting up of meetings on the basis of the activity groups for a session at the event. The activity group module 806 allows the event organizer to define the name of the group 806a, number of people allowed 806b, minimum number of people required for the group 806c, description 806d of the group, and moderator/leader 806e such as John Doe. Preferably, the attendees are assigned to a group 806a based on the attendee's request for the group 806a created and/or by the moderator 806e of that group.

In an exemplary embodiment of the present invention as shown in FIG. 9, for Group1 806f—the name of group 806a is Web Design, number of people allowed 806b is '115' and minimum number of people allowed 806c is '10'. The number of people allowed 806b is the maximum number of participants that can join the group 806a and the minimum number of people 806c is the requirement to make the group active. However, it will be readily apparent to those skilled in the art that various other inputs for defining activity groups 806 may be created with different attributes without deviating from the scope of the present invention.

Figure 10:
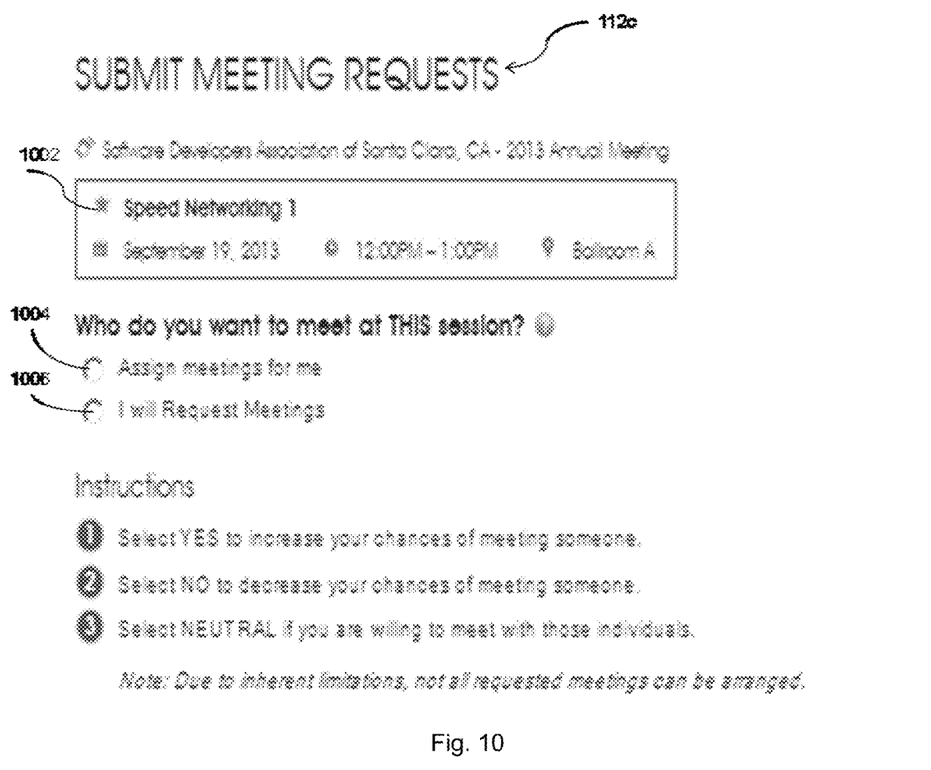
FIG. 10 is screen shot showing, by way of an example, a Web page for meeting request module.

FIG. 10 is a screenshot showing of the meeting request module 112c. The meeting request module 112c allows the registered users to submit meeting requests to meet other registered attendees. The attendees 102a may request meetings based on the name, company name or category of other attendees 102a with whom they do, or do not, want to meet. As shown in an exemplary embodiment, a session 1002 for Speed Networking 1 was created to be held on Sep. 19, 2013 at 12:00 p.m. to 1:00 p.m. in the session location of Ballroom A.

In a preferred embodiment of the present invention, the meeting request module 112c further provides the registered users with two options for submitting meeting requests. The first option 1004 provides the option of 'assign meetings for me' and the second option 1006 provides the option of 'I will request meetings'.

Figure 11:
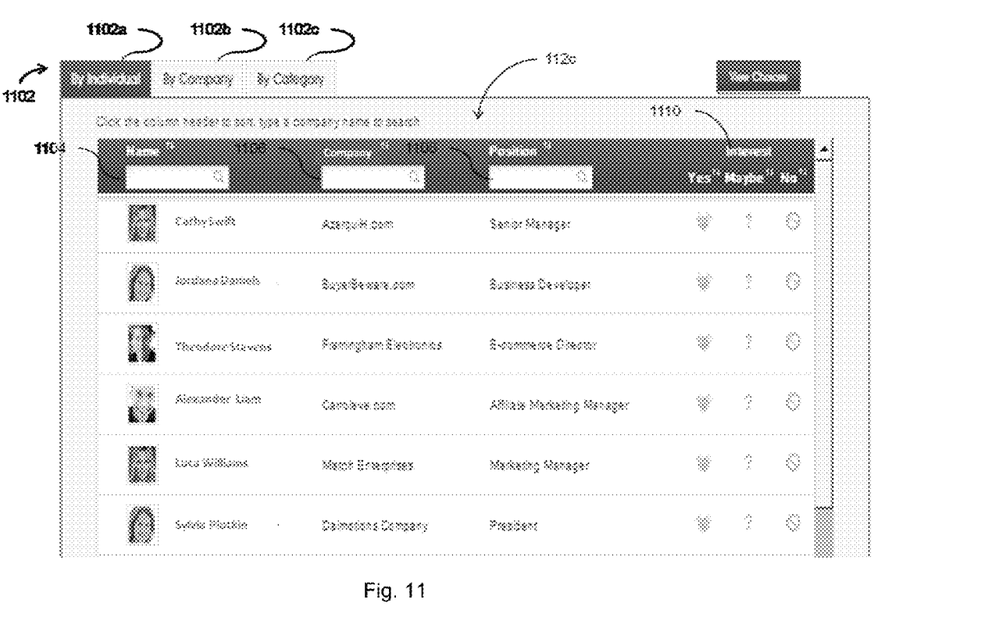
FIG. 11 is screen shot showing, by way of an example, a Web page for requesting meetings with other registered attendees.

When attendees 102a select option 1006 'I will request meetings', they gain access to the screenshot shown in FIG. 11 where they can manually request meetings with other attendees 102a. The meeting request module 112c allows attendees 102a to request either to participate or not participate in meetings with other selected attendees 102a. The meeting request module 112c includes a sorting out method 1102 for enabling attendees 102a to more quickly identify the other attendees 102a with whom they would like to meet or not meet.

The sorting out method 1102 further includes sorting by Individual 1102a, by Company 1102b, and by Category 1102c. In an exemplary embodiment of the present invention, the sorting out method 1102 provides sorting through the Name 1104, Category 1106, Position 1108. The Name 1104 list the names of the participants in a meeting, Category 1106 lists the category assigned to each participant, the Position 1108 lists the job title of each participant. Further, the meeting request module 112c provides an option of indicating interest in meeting or not meeting the participants selected.

The session participants may show their interest in meeting one or more of the participants by selecting from the interest options 1110 either of Yes, Maybe or No. Further, as shown in FIG. 11 of the present invention, each name of the participant under Name 1104 is a hyperlink. For example, Cathy Swift includes a hyperlink to allow other participants to view her profile. Similarly, the list of interested participants may be viewed through other sorting out methods 1102 such as by Company 1102b and by Category 1102c.

Figure 12:
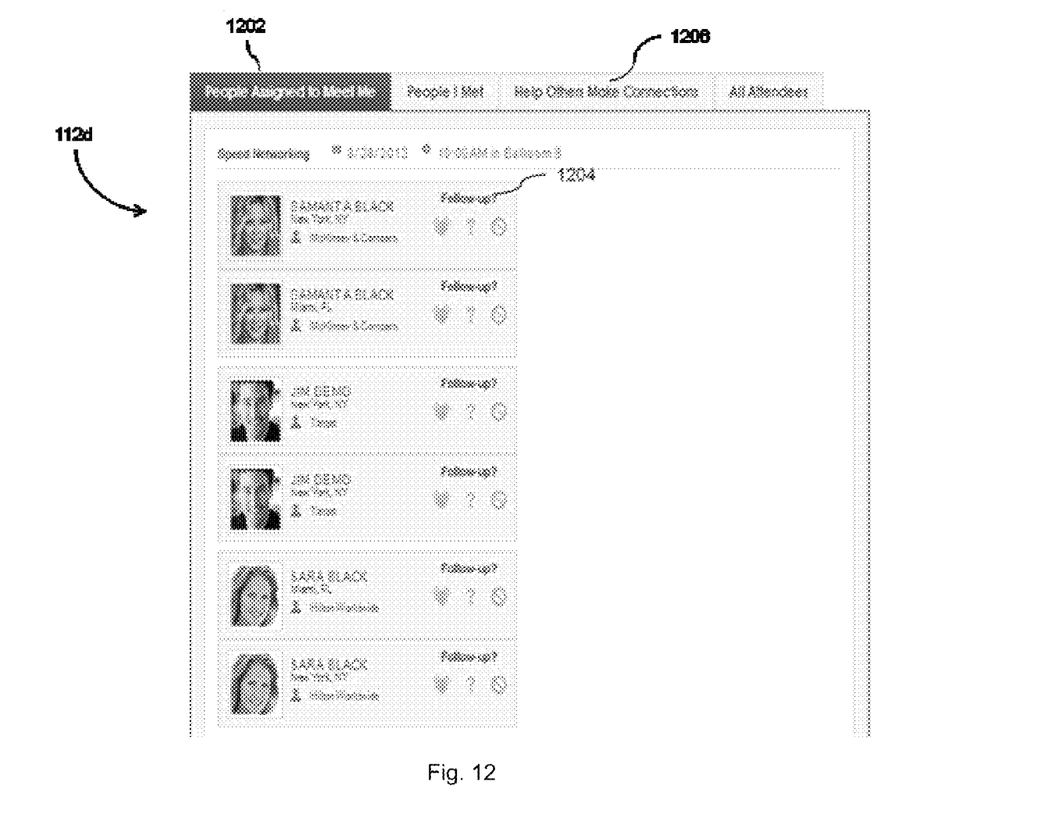
FIG. 12 is screen shot showing, by way of an example, a Web page for meeting assignment module.

FIG. 12 is a screenshot showing of a meeting assignment module 112d. The meeting assignment module 112d assigns meetings between at least two of the attendees 102a. In a preferred embodiment of the present invention, the meeting assignment module 112d generates a list of people assigned to meet each other on the basis of rules created under the event setup module 112d and meeting requests submitted by the attendees 102a in the meeting request module 112c.

The meetings are assigned by the meeting assignment module 112d based on the categories created by the event organizers and the meeting requests submitted by each participant. In a preferred embodiment of the present invention, the meeting assignment module 112d further shows the list 1202 of people assigned to meet the attendee. Further, the attendees 102a may also select an option of follow up module 1204 with the interested participant. The follow up module 1204 is explained in detail in conjunction with FIG. 13 of the present invention.

FIG. 13 is a screen shot showing a follow up module 1204. The follow up module 1204 reminds users to follow up with the interested participant for future meetings and provides access to the attendee profiles, messaging and calendar modules to facilitate the communication and scheduling of a follow up meeting. The follow up module 1204 includes Subject 1302 for the meeting, Location 1304 of the meeting, etc. Further, the follow up module 1204 provides an option of keeping private notes 1306 about the persons and categorizing them in ways that make it easier to follow up (e.g. Hot lead, Future Prospect, etc.) and keep all contacts organized (e.g., Friend, Close friend, Colleague, Close colleague, etc.).

Further, the system 100 includes a help others make connections module 1206 for recommending that at least one of the participants meets another participant.

It is to be noted that the system 104 may be run at near-real time processing, without deviating from the scope of the present invention. Thus, allowing the participants to request meetings and receive optimized meeting assignments on their web-enabled devices, while participating in a session.

The present invention offers various advantages such as provides more organized pre-assigned meetings on the basis of categories created by the event organizer and meeting requests submitted by the attendees of the event. The present invention provides structured approach to assign meetings among the attendees on the basis of their interests and requirements. The meetings that are interest based meetings are more profitable to attendees and the present invention allocate meetings by focusing on this aspect that it should be profitable for the attendee.

The invention claimed is:

1. A system for facilitating pre-assigned meetings between one or more users, said system to communicate with a server, said system comprising:
   a processor connected to the server;
   a graphical user interface for displaying processed data; and
   a memory unit connected to said processor, said memory unit to store data related to assignment of meetings, wherein said processor operable to process:
      a registration module displayed on the graphical user interface receives input from one or more users using their input device to register them either as an attendee or as an organizer through the server;
      an event setup module displayed on the graphical user interface receives input from one of one or more organizers to set up an event to become an event organizer of the event, further said event setup module creates one or more sessions at the event for allowing the users to become attendees of the event and to allow attendees to become participants in the one or more sessions of the event, and to create categories defining the participant's roles at each session during the event, and further assigns a location and schedule for each session;
      a meeting request module displays a list of attendees on the graphical user interface for facilitating pre-assigned meetings among the one or more attendees, said meeting request module displays at least two options for receiving requests from at least one attendee registered for the event to meet or not meet other attendees displayed on the list, wherein at least one attendee selects at least one of the option using the input device either meet or not meet at least one of other attendees on the basis of categories created by the organizer in said event setup module; and
      a meeting assignment module displays a list of meetings that are computed based on the options selected by one or more attendees to meet other attendees indicating which other attendees they are interested in meeting at the event at preferred time and location;
      wherein the meeting assignment module optimizes all the meeting assignments for the event and the optimization is more likely to assign meetings between attendees who requested meeting with each other at the event.

2. The system for facilitating pre-assigned meetings according to claim 1 wherein the event setup module further includes an event organizer details module for allowing submission of the details of the event organizer.

3. The system for facilitating pre-assigned meetings according to claim 1 wherein said event setup module further includes an event details module for allowing submission of the event details.

4. The system for facilitating pre-assigned meetings according to claim 1 wherein said event setup module further includes attendees allowed module for allowing selection of the individuals and/or types of attendees who may attend the event.

5. The system for facilitating pre-assigned meetings according to claim 1 wherein said event setup module further includes a session setup module for allowing selection of the type of sessions for the event.

6. The system for facilitating pre-assigned meetings according to claim 1 wherein said event setup module further includes a categories module for allowing the creation of the categories for the event.

7. The system for facilitating pre-assigned meetings according to claim 1 wherein said event setup module further includes a payments module for allowing at least one of the attendees to pay for attending the event or for allowing the event organizer to pay for providing the event.

8. The system for facilitating pre-assigned meetings according to claim 1 wherein said event setup module further includes a tables module for allowing creation of one or more tables to allow seating for assigned meetings between the participants during the session.

9. The system for facilitating pre-assigned meetings according to claim 1 wherein said event setup module further allows the event organizer to create rules specifying which categories of participants should meet in the session.

10. The system for facilitating pre-assigned meetings according to claim 1 wherein said meeting request module further includes one or more options for submitting meeting requests with said attendees of said event.

11. The system for facilitating pre-assigned meetings according to claim 1 further includes a follow up module to allow follow up with the interested attendees for future meetings and provides access to the profiles, messaging and calendar modules to facilitate the communication and scheduling of a follow up meeting.

12. The system for facilitating pre-assigned meetings according to claim 1 further includes a help others make connections module for recommending meetings between two participants.

* * * * *